United States Patent Office 3,457,178
Patented July 22, 1969

3,457,178
POLYHYDROXY POLYETHERS STABILIZED WITH 1,1,3,3-TETRAMETHOXY PROPANE AND POLYURETHANE FOAMS PREPARED THEREFROM
Almon G. Hovey, Northford, and William R. Andrews, Cheshire, Conn., assignors to Olin Mathieson Chemical Corporation, a corporation of Virginia
No Drawing. Filed Oct. 19, 1966, Ser. No. 587,688
Int. Cl. C09k 3/28, 3/10
U.S. Cl. 252—182                                          9 Claims

ABSTRACT OF THE DISCLOSURE

Mixtures of phosphorus-containing polyhydroxy polyethers and polyurethane foam reaction catalysts are stabilized by the addition of 1,1,3,3-tetramethoxy propane. These stabilized mixtures are subsequently reacted with organic polyisocyanates in the presence of blowing agents to provide polyurethane foams.

---

This invention relates to polyhydroxy polyethers stabilized with 1,1,3,3-tetramethoxy propane and to polyurethane foams prepared from said stabilized polyhydroxy polyethers. More specifically, this invention relates to a method for stabilizing mixtures of phosphorus-containing polyhydroxy polyethers and polyurethane foam reaction catalysts.

Polyurethane foams have found wide and varied uses in industry. For example, rigid foams are used as insulators, and semi-rigid and flexible foams are employed in cushioning and packaging applications.

The preparation of polyurethane foams by the reaction of a polyether containing at least two active hydrogen-containing groups as determined by the Zerewitinoff method with an organic polyisocyanate in the presence of a blowing agent, an emulsifier or foam-stabilizing agent, and a reaction catalyst is well known. Numerous attempts have been made to impart flame-retardance to these polyurethane foams in order to widen the scope of their commercial applications. The most economical flame-retardant polyurethane foams are provided by employing a phosphorus-containing polyhydroxy polyether, either alone or in a mixture with other polyethers, as the active hydrogen-containing compound in the previously described reaction with an organic polyisocyanate.

While excellent foams are obtained when the foam reactants are freshly mixed, two-can systems employing phosphorus-containing polyhydroxy polyethers wherein the reactants are provided as a kit to be mixed and foamed at various times after preparation of the kit, have heretofore been unsuccessful. In such a kit the phosphorus-containing polyhydroxy polyether and the reaction catalyst are provided in one package, the organic polyisocyanate is provided in a separate package, and the blowing agent, emulsifier or foam-stabilizing agent and any other additives are mixed into either or both packages. If the foam is not made soon after the kit is prepared, the catalyst reacts with the polyether, thereby losing its catalytic effectiveness and causing a failure of subsequent attempts to prepare a foam. It is believed that the hygroscopic polyether absorbs water and hydrolyzes to form acids which then react with the catalyst. It is also believed that phosphorus-containing polyhydroxy polyethers are subject to degradation by intra-molecular rearrangement. Since the catalyst cannot be stored in the isocyanate package where it would effect polymerization, this lack of stability has seriously hampered the commercial potential of two-component systems employing phosphorus-containing polyhydroxy polyethers. Furthermore, it is uneconomical and commercially unattractive to provide the catalyst in a separate container as part of a three-component system.

The primary object of this invention is to provide a stabilizer for mixtures of phosphorus-containing polyhydroxy polyethers and polyurethane foam reaction catalysts. Another object of this invention is to provide a two-component flame-retardant polyurethane foam kit having an excellent shelf-life under a wide variety of storage conditions. These and other objects are apparent from the following detailed description of the invention.

The foregoing objects have been accomplished in accordance with this invention wherein it has been found that 1,1,3,3-tetramethoxy propane is a highly effective stabilizer for mixtures of phosphorus-containing polyhydroxy polyethers and polyurethane foam reaction catalysts. Surprisingly, small quantities of this compound are effective to extend the shelf-life of the mix from about 1 to 4 weeks without the stabilizer to at least 3 months with the stabilizer of this invention. Although the stabilization mechanization is not known with certainty it is believed that the stabilizer functions as a scavenger for both acid and water.

The 1,1,3,3-tetramethoxy propane utilized in this invention is a commercially available compound having a boiling point of 183° C. and a specific gravity of 0.9930–0.9660 at 20° C. While it is generally commingled with the polyether in a proportion in the range between about 0.5 to 10 parts per 100 parts of phosphorus-containing polyhydroxy polyether, with about 1.5 to 5 parts being preferred, as little as 0.1 part and lower provide effective stabilization. Greater amounts can also be employed, but the ranges listed herein are preferred for economic reasons.

The discovery of the effectiveness of 1,1,3,3-tetramethoxy propane as a stabilizer in the process of this invention is particularly surprising and unexpected in view of the fact that related acetals failed to achieve the desired results. For instance, dimethoxy methane, bis (2-methoxy ethoxy) methane and 3,3-diethoxy propene-1 all failed to stabilize various phosphorus-containing polyhydroxy polyether mixes.

By the term "phosphorus-containing polyhydroxy polyether," as used in the claims and specification herein, is meant any polyhydroxy polyether containing chemically bound phosphorus. Illustrative of these phosphorus-containing polyhydroxy polyethers are the reaction product of starch and phosphoric acid, the oxyalkylated reaction product of starch and phosphoric acid, the reaction product of starch, phosphoric acid and a polyhydric alcohol, the oxyalkylated reaction product of starch, phosphoric acid and a polyhydric alcohol. Other suitable phosphorus-containing polyhydroxy polyethers include O,O-diethyl-N,N-bis (2-hydroxyethyl) aminoethylphosphonate; Vircol-82, a polyol having a hydroxyl number of 212 mg. KOH/gm., a phosphorus content of 11.2 percent by weight, a viscosity of 250 cps. at 25° C. and a functionality of 2; and E P–209–S, a phosphorus-containing polyol having a hydroxyl number of 401 mg. KOH/gm., a phosphorus content of 6.88 percent by weight and a viscosity of 1300 cps. at 24.5° C.

Thus, the reaction product of starch and phosphoric acid is prepared by admixing starch with phosphoric acid at an elevated temperature. The oxyalkylated reaction product of starch and phosphoric acid is prepared by reacting a mixture of starch and phosphoric acid with an epoxide, i.e., any compound or mixture of compounds containing a 1,2-oxide. Typical of such compounds are alkylene oxides, aryl-alkyl oxides, cycloalkylene oxides, and the like. Specific reactants include, but are not limited to, ethylene oxide, propylene oxide, butylene oxide, phenylene oxide, glycidol, isobutylene oxide, n-hexyl oxide, epihalohydrins, cyclobutylene oxide, cyclohexylene oxide, mixtures thereof and the like. The preferred epoxides are the lower alkylene oxides, that is, those containing between about 2 and about 6 carbon atoms, such as ethylene oxide, propylene oxide, etc.

Any starch having a formula $(C_6H_{10}O_5)_x$ is employed in the preparation of the starch-phosphoric acid based polyether. These compounds are carbohydrates or polysaccharides which occur naturally in many plant cells. Typical starches which may conveniently be employed include potato starch, corn starch, chlorinated starches, rice starch, tapioca starch, wheat starch, mixtures thereof and the like. From an economic standpoint, tapioca starch, potato starch and corn starch are preferred. The starch may be in anhydrous form or in the wet stage, for example, containing as high as about 20 percent by weight of water.

Any available phosphoric acid may be employed in preparing the starch-phosphoric acid based polyether. From the standpoint of economics, availability, and ease of handling the preferred phosphoric acids include, but are not limited to, phosphoric acids containing between about 75 and about 120 percent $H_3PO_4$ by weight. Commercially available phosphoric acids having concentrations within this range include 85 percent phosphoric acid (61.5 percent $P_2O_5$), 100 percent phosphoric acid (76 percent $P_2O_5$), 115 percent phosphoric acid (84 percent $P_2O_5$), phosphorus anhydride (100 percent $P_2O_5$), and the mixtures thereof.

The proportion of total epoxide which can be added to the reactants in preparing the oxyalkylated reaction product of starch and phosphoric acid is limited only by the amount of free acid and/or catalyst that may be present. The mixture formed by mixing starch and phosphoric acid, as described above, contains hydroxyl radicals provided by the phosphoric acid which are available to react with the epoxide. In addition, the hydroxyl radicals provided by the starch and its degradation products, the polyhydric alcohol and water, if present, are available to react with the epoxide as long as there is free acid and/or catalyst present in the system. Thus, the minimum amount of epoxide which will react with the mixture formed by admixing starch and phosphoric acid is approximately equivalent to 1 mole of epoxide per hydroxyl radical present as phosphoric acid. However, the proportion of epoxide usually added is between about 1 and about 2 moles of epoxide per total hydroxyl radical present in the system.

In another embodiment, a starch-phosphorus based-polyether is prepared by adding phosphoric acid to an admixture of a polyhydric alcohol with hydrolyzed starch, and then oxyalkylating the resulting material. Although the proportion of reactants is not critical, an amount of phosphoric acid equivalent to a $P_2O_5$ molar concentration in the range between about 1.5 and about 3 moles of $P_2O_5$ per glucose unit weight of starch has been found to provide a suitable reaction medium.

Any polyhydric alcohol containing at least two hydroxyl groups may be employed in the preparation of the above-described starch-phosphoric acid based polyhydroxy polyether. It is preferred to employ glycerol, ethylene glycol, propylene glycol, sorbitol and the like due to their availability and ease of reaction. However, other polyhydric alcohols which may be conveniently employed include, but are not limited to, pentaerythritol, dipentaerythritol, hexanetriol, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, mixtures thereof, and the like.

When a polyhydric alcohol is employed, the proportion is generally in the range between about 0.2 and 4 and preferably in the range between about 0.2 and about 1.0 mole of alcohol per glucose unit weight of starch.

Preparation of starch-phosphoric acid based polyhydroxy polyethers is effected by heating the starch-phosphoric acid mixture at a temperature between 30° and 120° C. The oxyalkylation steps are preferably carried out at similar temperatures. Stripping of volatiles to provide a pure product is desirable in the preparation of this polyether also.

The phosphorus-containing polyhydroxy polyether can be employed alone or as a mixture with one or more non-phosphorus containing polyhydroxy polyethers. Exemplificative of the latter materials are those described in U.S. Patents 3,072,582; 3,095,386; 3,248,348; 3,248,349; and 3,167,538. Where such a mixture is utilized, the polyether blend should contain at least 2 percent by weight of phosphorus in order to confer non-burning properties on the foam, and the stabilizer is provided in an amount from about 0.5 to 10 parts per 100 parts of the phosphorus-based polyhydroxy polyether. By the term "phosphorus" in the claims and specification herein is meant chemically bound phosphorus.

The hydroxyl number of the polyhydroxy polyether will determine the type of foam obtained after reaction with the organic isocyanate component. Thus, in preparing rigid foams, the polyether should have a hydroxyl number of about 175–800. Polyethers having hydroxyl numbers between about 75 and 175 provide semi-rigid foams, while flexible foams are made from polyethers having hydroxyl numbers between about 30 and 60.

Any of the catalysts known to be useful in the preparation of polyurethane foams can be employed in this invention including tertiary amines, metallic salts, and mixtures thereof. Typical tertiary amines include, but are not limited to the following: 1,1,3,3 - tetramethylbutanediamine, N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, etc. Generally speaking, the catalyst is employed in an amount from 0.1 to 2.0 percent by weight based on the total polyhydroxy polyether content.

Any of the widely-known organic polyisocyanates can be employed in the preparation of the polyurethane foams of this invention. An illustrative commercially available isocyanate is toluene diisocyanate, which is a mixture of about 80 percent by weight of 2,4-toluene diisocyanate and about 20 percent of the 2,6-isomer. Other typical exemplificative isocyanates include, but are not limited to, the following: methylene-bis-(4-phenyl isocyanate); 3,3'-bitoluene-4,4'-diisocyanate; 3,3' - dimethoxy-4,4'-biphenylene diisocyanate; naphthalene-1,5-diisocyanate; hexamethylene diisocyanate; 1,4-phenylene diisocyanate; polyphenylene polymethylene polyisocyanate; etc. The amount of isocyanate employed in the preparation of the polyurethane foams should be sufficient to provide at least 0.7 NCO group per hydroxyl group present in the reaction system. An excess of isocyanate compound may be conveniently employed; however, this is generally undesirable due to the high cost of the isocyanate compounds. It is preferable, therefore, to employ no greater than about 1.5 NCO groups per hydroxyl group and preferably between about 0.9 and 1.1 NCO groups per hydroxyl group.

The foaming agent employed can be any of those known to be useful for this purpose, such as halogenated hydrocarbons, and mixtures thereof. As discussed previously, it can be added to either the isocyanate or polyether package, or, if desired, it can be added to both packages. Typical halogenated hydrocarbons include, but are not limited to, the following: monofluorotrichloromethane, difluorodichloromethane, 1,1,2 - trichloro - 1,1,2 - trifluoroethane, methylene chloride, chloroform, and carbon tetrachloride. The amount of foaming agent employed may be varied within a wide range. Generally, however, the halogenated hydrocarbons are employed in an amount from 1 to 50 parts by weight per 100 parts by weight of the polyhydroxy polyether.

It is preferred in the preparation of the polyurethane foams of the present invention to employ minor amounts of a surfactant in order to improve the cell structure of the polyurethane foam. Typical of such surfactants are the silicone oils and the siloxane-oxyalkylene block copolymers. Generally, up to 2 parts by weight of the surfactant is employed per 100 parts of polyether.

Various additives can be added to either package to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

The polyurethane foam is conveniently made by mixing the components of both packages. Thus, in a preferred embodiment of this invention, the blowing agent is mixed with the stabilized polyether mixture and the polyisocyanate is provided in a second package. Preferably, the quantities are adjusted so that one merely mixes the total contents of both packages to obtain the desired foam.

The following examples illustrate the practice of this invention. All parts and percentages are by weight unless otherwise specified.

Example 1

To a nitrogen purged 100 gallon reactor was charged 22.2 lbs. of 85 percent phosphoric acid and 91.7 lbs. of 105 percent phosphoric acid. The reactor was closed and the acid mixture heated to 50° C. Potato starch (52.8 lbs.) was added to the acid over a period of 15 minutes at a temperature of about 50° C. The reactor was closed again, heated to 90° C., and charged with additional potato starch (52.8 lbs.). The reaction mixture was heated at 90° C. until a sample thereof did not give a blue color to a standard $KI-I_2$ testing solution, thereby indicating complete hydrolysis of the starch. Propylene oxide (520 lbs.) was added gradually while maintaining a temperature between about 90° and 100° C. and the mixture postreacted for one hour at 90°–100° C. The volatiles were stripped at 85°–90° C. and 10 mm. Hg pressure for 3 hours; an epoxide water scavenger was added and the product filtered at 80–85° C. The resulting starch-phosphoric acid based polyol had a hydroxyl number of 485 mg. KOH/gm. and a viscosity of 3272 c.p.s. at 25° C.

A polyol mixture comprising 900 parts of the above starch-phosphoric acid based polyol, 18.0 parts DC-201 foam-stabilizing agent,[1] 18.0 parts 1,1,3,3-tetramethylbutanediamine, 288 parts trichloromonofluoromethane and 45.0 parts 1,1,3,3-tetramethoxy propane was prepared and divided into nine portions. Polyphenylene polymethylene polyisocyanate (120 parts) was added to one of the polyol portions and the resulting mixture stirred vigorously for about 15 seconds and then poured into a rectangular box. Creaming was observed after 15 seconds; rising was completed after 61 seconds and a tack-free foam was observed after 68 seconds.

This foam was rigid, had a density of 1.97 lb./ft.$^3$, a parallel compressive strength of 32.3 lb./in.$^2$; a perpendicular compressive strength of 14 lb./in.$^2$, and had an excellent closed-cell structure. Ten samples of this foam were non-burning when tested in accordance with the procedure defined in ASTM D–1692–59T.

The remaining portions were stored in covered urethane-lined tin cans at 150° C. for specified periods ---
[1] DC–201 is a silicone foam-stabilizing agent having the following general formula:

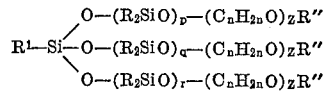

wherein $R_2$, $R^1$ and $R''$ are $C_{1-8}$ alkyl radicals; $p$, $q$ and $r$ are each 2 to 15 and $-(C_nH_{2n}O)_z-$ is a polyoxyalkylene block which is preferably a polyoxyethylene-polyoxypropylene block containing from 10 to 50 of each oxyalkylene unit.

and then similarly reacted with 120 parts of polyphenylene polymethylene polyisocyanate. The foaming data for each mixture is set forth in the following table, where "Days" represents the number of days the mixture was stored prior to reaction with the isocyanate, and the "Time" values are given in seconds. All the foams were rigid, closed-cell foams having the same excellent properties as the freshly-made foam.

| Days | 1 | 3 | 6 | 8 | 10 | 13 | 20 | 30 |
|---|---|---|---|---|---|---|---|---|
| Cream time | 26 | 27 | 25 | 29 | 35 | 41 | 50 | 54 |
| Rise time | 62 | 79 | 68 | 82 | 89 | 90 | 117 | 129 |
| Tack-free time | 79 | 94 | 87 | 112 | 123 | 117 | 142 | 145 |

For purposes of comparison, polyol mixtures were prepared in the same manner as Example 1 but omitting the 1,1,3,3-tetramethoxy propane. The foaming data is set forth in the following table, wherein times are given in seconds and "Days" represents the storage time at 150° C. before the foam was prepared. The foam prepared immediately was rigid, open-celled and had a density of 2.0 lb./ft.$^3$, a parallel compressive strength of 32 lb./in.$^2$, a perpendicular compressive strength of 14 lb./in.$^2$ and ten samples thereof were non-burning per ASTM D–1692–59T.

| Days | 0 | 1 | 4 | 5 | 7 |
|---|---|---|---|---|---|
| Cream time | 16 | 26 | 27 | 78 | 91 |
| Rise time | 64 | 86 | 95 | 168 | 183 |
| Tack-free time | 73 | 101 | 113 | 187 | 212 |

The foams prepared after storage of the polyether mixture for 5 days began to fail, as indicated by the fact that the time required to obtain a tack-free foam was more than twice that required when fresh polyether mixture was employed. After storage for 7 days, efforts to provide a foam failed.

For further purposes of comparison, polyol mixtures were prepared in the same manner as Example 1 but employing 2,2-diethoxy propane as a stabilizer in place of the 1,1,3,3-tetramethoxy propane. After storage for 7 days, efforts to prepare a foam failed.

Example 2

The procedure of Example 1 for preparing the polyether and foams were duplicated, except for storing the polyether mixtures under ambient conditions and for different periods. The following table represents the foaming data.

| Days | 0 | 32 | 56 | 90 |
|---|---|---|---|---|
| Cream time | 18 | 23 | 17 | 17 |
| Rise time | 54 | 58 | 87 | 80 |
| Tack-free time | 61 | 60 | 78 | 85 |

All the foams were rigid, open-celled, non-burning and had excellent physical properties.

For purposes of comparison, Example 2 was duplicated omitting 1,1,3,3-tetramethoxy propane from the formulation. The foaming data is set forth below:

| Days | 0 | 35 | 56 | 90 |
|---|---|---|---|---|
| Cream time | 22 | 35 | 40 | Fail. |
| Rise time | 91 | 91 | 145 | |
| Tack-free time | 80 | 132 | 155 | |

As indicated by the test results, foams prepared after storage of the polyether mixture for 56 days were beginning to fail, and no foams were obtained after 90 days.

Example 3

A 4:1 molar mixture of methyl glucoside and glycerol was heated in the presence of potassium hydroxide catalyst and then reacted with propylene oxide as described in Example 1 of U.S. Patent 3,167,538.

A polyol mixture was prepared from 400 parts methyl glucoside-glycerol based polyether, 160 parts Vircol–82 (a polyol containing 11.2 percent by weight phosphorus and having a hydroxyl number of 212 mg. KOH/gm., a viscosity of 250 cps. at 25° C. and a functionality of 2), 10.0 parts DC–201 foam stabilizing agent as described in Example 1, 10.0 parts 1,1,3,3-tetramethylbutanediamine, 172 parts monochlorotrifluoromethane and 12.0 parts 1,1,3,3-tetramethoxy propane. The mixture was divided into 4 portions and one portion reacted immediately with 131 parts of polyphenylene polymethylene polyisocyanate to provide a rigid, closed-cell foam having a density of 2.1 lb./ft.$^3$, a parallel compressive strength of 26 lb./in.$^2$ and a perpendicular compressive strength of 19 lb./in.$^2$. The foam was self-extinguishing per ASTM D–1962–59T. The remaining portions were stored in closed urethane-lined tin cans at ambient temperature prior to reaction with corresponding portions of polyisocyanate. The foaming data is set forth in the following table.

| Days | 0 | 77 | 94 | 250 |
|---|---|---|---|---|
| Cream time | 20 | 29 | 41 | 48 |
| Rise time | 95 | 130 | 168 | 204 |
| Tack-free time | 95 | 285 | 420 | 420 |

Very satisfactory foams were obtained after storage of the polyether mixture for 27 days. Although the foaming times were not satisfactory after 94 and 250 days of storage, excellent foams were still achieved.

For purposes of comparison, a polyol mixture was prepared in the same manner as Example 3 but omitting the 1,1,3,3-tetramethoxy propane. The foaming data is set forth in the following table.

| Days | 0 | 1 | 7 | 30 |
|---|---|---|---|---|
| Cream time | 17 | 17 | 51 | Failed. |
| Rise time | 152 | 130 | 360 | |
| Tack-free time | 180 | 176 | 1,080 | |

After 7 days of storage, the foams began to fail, and no foams were obtained where the polyether mixture was stored for 30 days.

Example 4

Following the procedure of Example 1, and using the same ingredients but employing only 2.0 parts 1,1,3,3-tetramethoxy propane, foams were made at different intervals after preparation of the polyether mixture. The foaming data is set forth below.

| Months | 0 | 2 | 3 | 4 | 6 |
|---|---|---|---|---|---|
| Cream time | 18 | 19 | 21 | 34 | 37 |
| Rise time | 83 | 91 | 104 | 127 | 130 |
| Tack-free time | 68 | 71 | 113 | 153 | 170 |

The foam obtained after storage of the polyether mixture at ambient temperatures for 6 months was rigid, had a density of 2.4 lb./ft.$^3$, a parallel compressive strength of 35 lb./in.$^2$, a perpendicular compressive strength of 18 lb./in.$^2$, and an excellent closed cell structure. Ten samples of the foam were non-burning per ASTM D–1692–59T.

What is claimed is:

1. A stable polyhydroxy polyether mixture capable of reaction with a polyisocyanate to provide a polyurethane foam which comprises a phosphorus-containing polyhydroxy polyether containing at least 2 percent by weight of chemically bound phosphorus, a polyurethane foam reaction catalyst and a stabilizing amount of 1,1,3,3-tetramethoxy propane.

2. The composition of claim 1 in which the 1,1,3,3-tetramethoxy propane is provided in an amount from about 0.5 to 10.0 parts per 100 parts of the phosphorus-containing polyhydroxy polyether.

3. The composition of claim 1 in which the 1,1,3,3-tetramethoxy propane is provided in an amount from about 1.5 to 5.0 parts per 100 parts of the phosphorus-containing polyhydroxy polyether.

4. The composition of claim 1 in which the phosphorus-containing polyhydroxy polyether is provided as a mixture thereof with a non-phosphorus containing polyhydroxy polyether, said mixture containing at least 2 percent by weight of phosphorus.

5. The composition of claim 1 in which the phosphorus-containing polyhydroxy polyether is the oxypropylated reaction product of starch and phosphoric acid.

6. The composition of claim 1 in which the polyurethane foam reaction catalyst is 1,1,3,3-tetramethylbutanediamine.

7. The composition of claim 1 further comprising a blowing agent.

8. The composition of claim 1 in which the polyurethane catalyst is provided in an amount from about 0.2 to about 2 percent by weight based on the phosphorus-containing polyhydroxy polyether.

9. The composition of claim 7 in which the phosphorus-containing polyhydroxy polyether is the oxypropylated reaction product of starch and phosphoric acid, the polyurethane foam reaction catalyst is 1,1,3,3-tetramethylbutanediamine and the blowing agent is trichloromonofluoromethane.

References Cited

UNITED STATES PATENTS 3,297,582  1/1967  Pawlyk _____ 252—188.3
3,378,497  4/1968  Lanham _____ 252—182
3,393,254  7/1968  Hartman et al. _____ 260—953

DONALD E. CZAJA, Primary Examiner

MICHAEL B. FEIN, Assistant Examiner

U.S. Cl. X.R.

206—84; 252—188.3; 260—2.5, 652.5